US011887333B2

(12) United States Patent
Rousseau

(10) Patent No.: US 11,887,333 B2
(45) Date of Patent: Jan. 30, 2024

(54) METHOD FOR DETERMINING A SOLAR MASK FOR AN INSTALLATION AND METHOD FOR CHECKING THE COMPATIBILITY OF A MOTORIZED DRIVE DEVICE

(71) Applicant: SOMFY ACTIVITES SA, Cluses (FR)

(72) Inventor: Fabien Rousseau, Mieussy (FR)

(73) Assignee: SOMFY ACTIVITES SA, Cluses (FR)

( * ) Notice: Subject to any disclaimer, the term of this patent is extended or adjusted under 35 U.S.C. 154(b) by 317 days.

(21) Appl. No.: 17/440,888

(22) PCT Filed: Mar. 20, 2020

(86) PCT No.: PCT/EP2020/057747
§ 371 (c)(1),
(2) Date: Sep. 20, 2021

(87) PCT Pub. No.: WO2020/188077
PCT Pub. Date: Sep. 24, 2020

(65) Prior Publication Data
US 2022/0164983 A1 May 26, 2022

(30) Foreign Application Priority Data

Mar. 20, 2019 (FR) ........................................ 1902889

(51) Int. Cl.
*G06T 7/73* (2017.01)
*H02S 40/20* (2014.01)
*H02S 40/38* (2014.01)
*E06B 9/17* (2006.01)
*E06B 9/42* (2006.01)
*E06B 9/70* (2006.01)

(52) U.S. Cl.
CPC ................. *G06T 7/74* (2017.01); *E06B 9/17* (2013.01); *E06B 9/42* (2013.01); *E06B 9/70* (2013.01);
(Continued)

(58) Field of Classification Search
CPC ... G06T 7/74; G06T 2207/30244; E06B 9/17; E06B 9/42; E06B 9/70; H02S 40/20;
(Continued)

(56) References Cited

U.S. PATENT DOCUMENTS

2006/0213386 A1\* 9/2006 Funakura .................. G06T 7/70
715/201
2007/0150198 A1\* 6/2007 MacDonald ............ G01W 1/12
702/2
(Continued)

FOREIGN PATENT DOCUMENTS

EP 1705614 A2 9/2006
WO 2019025389 A1 2/2019

OTHER PUBLICATIONS

International Search Report and Written Opinion dated May 6, 2020 in corresponding application No. PCT/EP2020/057747; w/ English machine translation (total 23 pages).

*Primary Examiner* — Thai Q Tran
*Assistant Examiner* — Stephen R Smith
(74) *Attorney, Agent, or Firm* — Seckel IP, PLLC

(57) ABSTRACT

Disclosed is a method for determining a solar mask for a facility that comprises a step (E10) of positioning a mobile terminal at a predetermined location of a photovoltaic panel. Following the step (E10), the method comprises a step (E20) of taking a single photograph with a camera of the mobile terminal and a step (E30) of determining an orientation of the camera, during the step (E20), by means of an orientation detection device and a controller of the mobile terminal. The method further comprises a step (E40) of extending at least one contour of the photograph, in at least one direction, and a step (E60) of superimposing data from the extended photograph with a sun path diagram, in a common reference frame, so as to determine the solar mask.

20 Claims, 6 Drawing Sheets

(52) U.S. Cl.
CPC .............. *H02S 40/20* (2014.12); *H02S 40/38* (2014.12); *G06T 2207/30244* (2013.01)

(58) Field of Classification Search
CPC ......... H02S 40/38; H02S 50/00; Y02E 10/50; Y02E 70/30
USPC ...... 348/135; 345/420; 356/139.01; 382/103
See application file for complete search history.

(56) References Cited

U.S. PATENT DOCUMENTS

| | | | |
|---|---|---|---|
| 2007/0214665 A1* | 9/2007 | Courter .................. | G01W 1/12 73/170.27 |
| 2009/0257650 A1* | 10/2009 | Lim ........................ | G06T 7/143 382/165 |
| 2010/0061593 A1* | 3/2010 | MacDonald ............ | G01W 1/12 382/103 |
| 2010/0302363 A1* | 12/2010 | Mackenzie ............ | G01C 15/00 348/135 |
| 2013/0314699 A1* | 11/2013 | Jungerman ........... | G01J 1/0242 356/139.01 |
| 2014/0145511 A1* | 5/2014 | Renzi ...................... | E06B 9/11 307/130 |
| 2014/0176543 A1* | 6/2014 | MacDonald ............ | G06T 17/05 345/420 |
| 2017/0075183 A1* | 3/2017 | Brown ................. | G05B 19/048 |
| 2017/0116460 A1* | 4/2017 | Jungerman ............ | G06V 20/13 |
| 2020/0057346 A1* | 2/2020 | Zedlitz ................... | G02F 1/163 |
| 2020/0096387 A1* | 3/2020 | Koulomzin ........... | G01S 3/7868 |
| 2020/0098170 A1* | 3/2020 | Sehgal .................... | G06F 30/20 |
| 2020/0212842 A1 | 7/2020 | Rousseau et al. | |

* cited by examiner

[Fig 1]
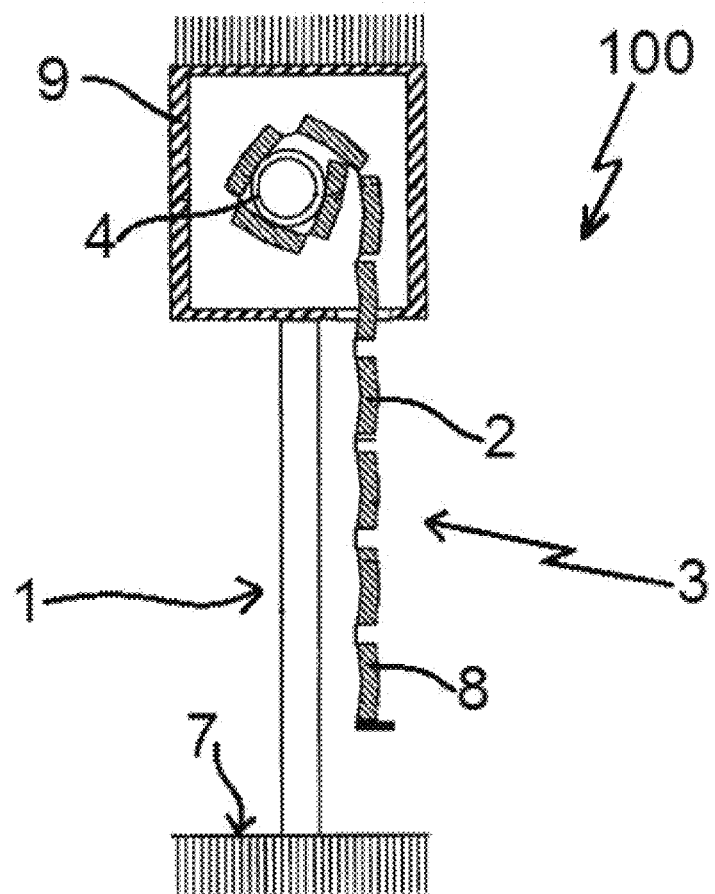

[Fig 2]
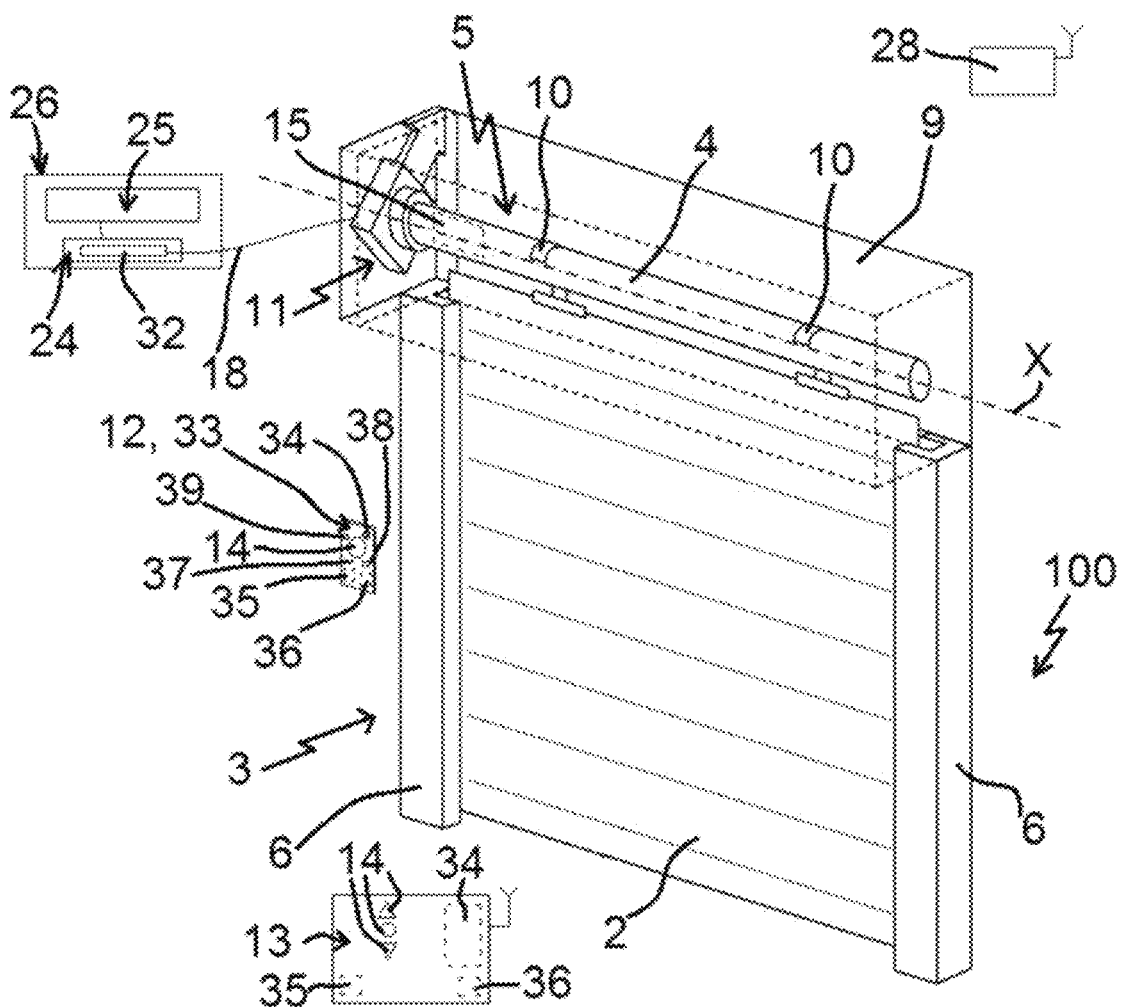

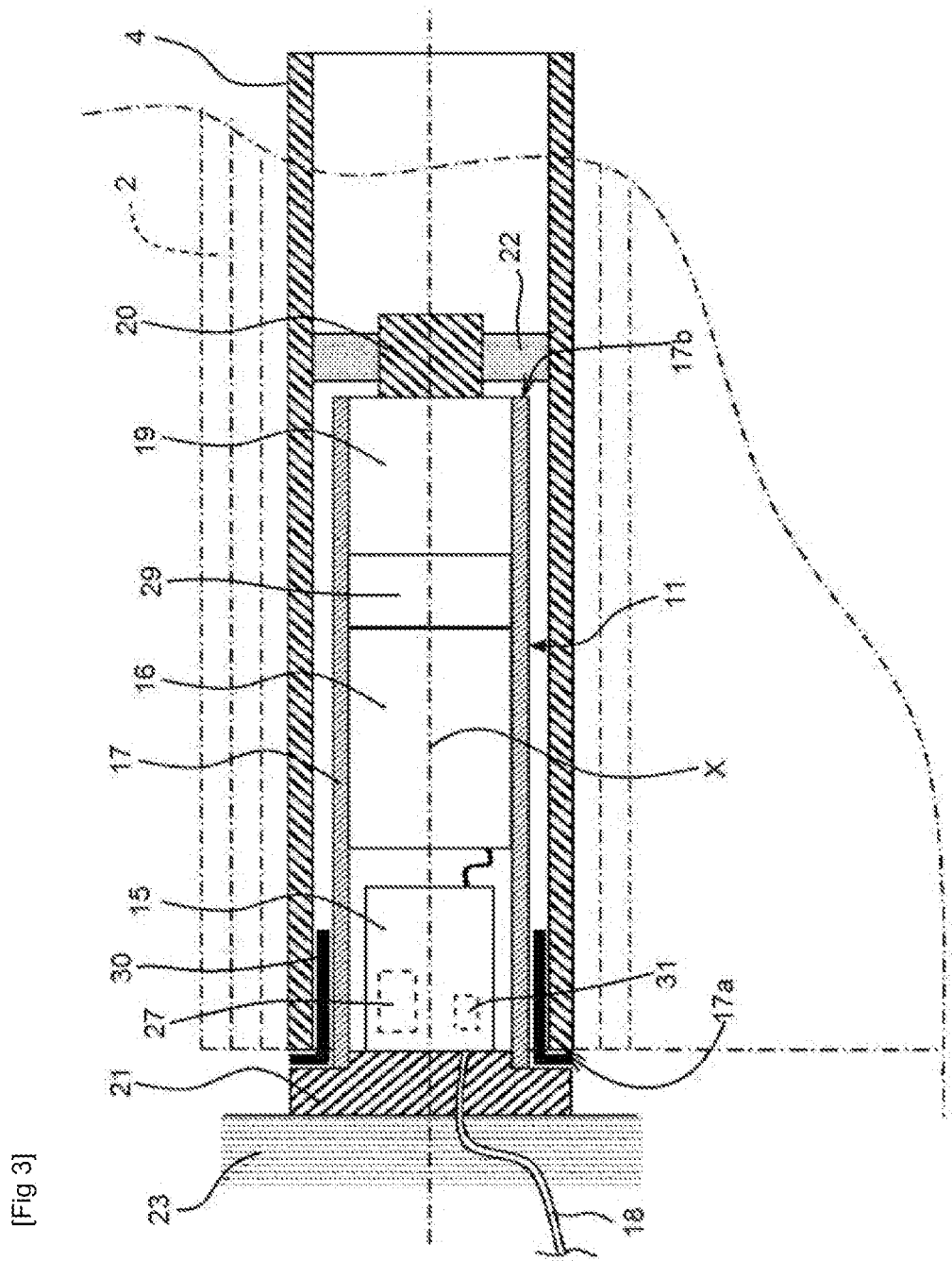
[Fig 3]

[Fig 4]
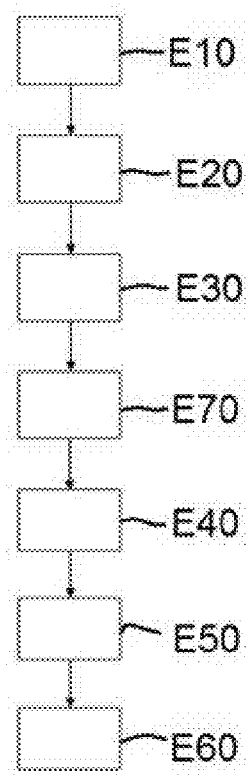
[Fig 5]
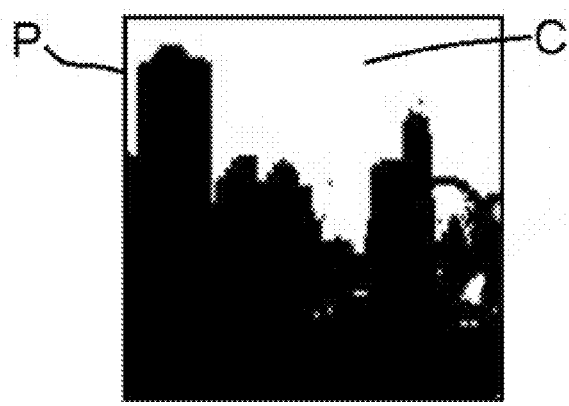

[Fig 6]
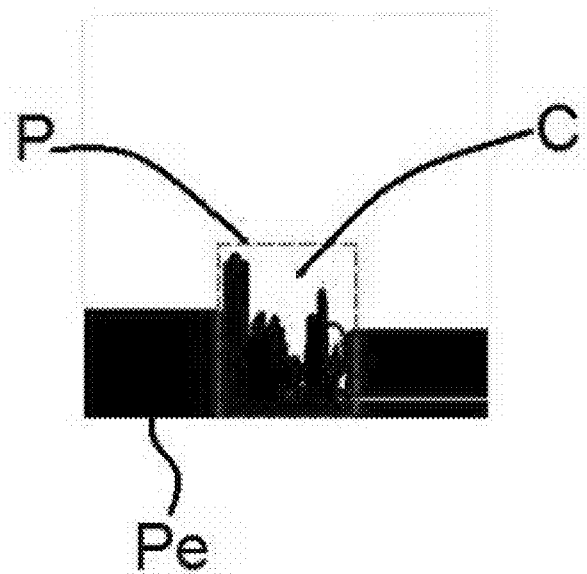
[Fig 7]
[Fig 8]
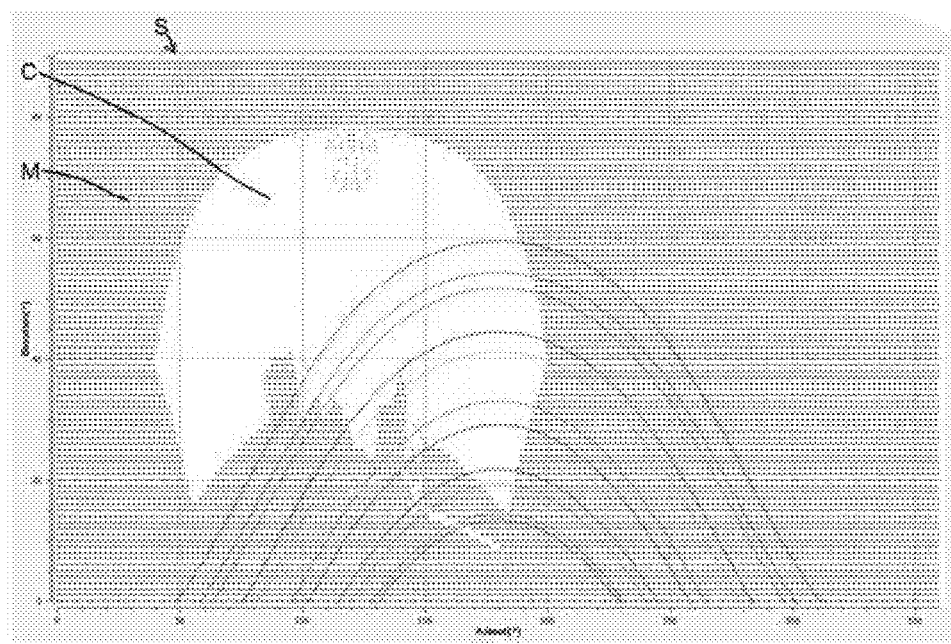

[Fig 9]
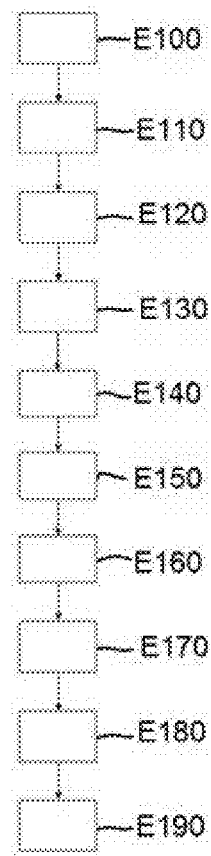

METHOD FOR DETERMINING A SOLAR MASK FOR AN INSTALLATION AND METHOD FOR CHECKING THE COMPATIBILITY OF A MOTORIZED DRIVE DEVICE

The present invention relates to a method for determining a solar mask for a closure, shading or solar protection installation.

The present invention also relates to a method for checking compatibility of a motorized drive device for a closure, shading or solar protection installation as a function of the solar mask determined by such a method for determining a solar mask.

In general, the present invention relates to the field of shading devices comprising a motorized drive device that sets a screen in motion, between at least one first position and at least one second position.

A motorized drive device comprises an electromechanical actuator of a mobile closure, shading or solar protection element, such as a shutter, a door, a gate, an awning or any other equivalent furniture, referred to below as a screen.

The document WO 2019/025389 A1, which describes an installation comprising a shading device and a motorized drive device, is already known. The shading device comprises a screen. The screen is configured to be moved between an open position and a closed position by means of the motorized drive device. The motorized drive device comprises an electromechanical actuator and an autonomous electrical energy supply device. The autonomous electrical energy supply device comprises a photovoltaic panel and an electrical energy storage device. The autonomous electrical energy supply device is configured to supply the electromechanical actuator with electrical energy.

That document also describes a method for determining a solar mask for the installation, this method being carried out by means of a mobile terminal. The mobile terminal comprises a controller, a photographic instrument and an orientation detection device. The method comprises a step of positioning the mobile terminal at a predetermined location of the photovoltaic panel, in an assembled configuration of the installation. After the step of positioning the mobile terminal, the method comprises a step of acquiring a photograph by means of the photographic instrument of the mobile terminal. The method furthermore comprises a step of determining an orientation of the photographic instrument of the mobile terminal, during the step of acquiring the photograph, by means of the orientation detection device and the controller of the mobile terminal.

However, in the case in which a single photograph is acquired by means of the photographic instrument of the mobile terminal in order to determine the solar mask at the predetermined location of the photovoltaic panel and given that the field angles of the photographic instrument of the mobile terminal are limited, it is necessary to make an hypothesis in order to determine an environment of what is probably present as an obstacle to the solar radiation perceived by the photovoltaic panel around the photograph acquired.

In the case in which a single photograph is acquired by means of the photographic instrument of the mobile terminal, the difficulty is to determine a solar radiation that can be perceived by the photovoltaic panel at the predetermined location.

A first hypothesis, referred to as pessimistic, is to consider that everything which is outside the photograph acquired is masked and is considered as an obstacle to the solar radiation perceived by the photovoltaic panel at the predetermined location. Consequently, no solar energy supply is delivered to the photovoltaic panel at the predetermined location outside a determined sky region belonging to the photograph, after the photograph is acquired.

A second hypothesis, referred to as optimistic, is to consider that everything which is outside the photograph acquired is visible and is considered as a sky region allowing the passage of solar radiation perceived by the photovoltaic panel at the predetermined location. Consequently, a solar energy supply is delivered to the photovoltaic panel at the predetermined location by the entire environment in addition to a determined sky region belonging to the photograph, after the photograph is acquired.

Consequently, these first and second hypothesis are not satisfactory.

The first hypothesis is too severe. A result of a compatibility checking diagnosis of the motorized drive device for the installation would often be negative.

Nevertheless, the second hypothesis is not severe enough. A result of a compatibility checking diagnosis of the motorized drive device for the installation would often be positive.

The object of the present invention is to resolve the aforementioned drawbacks and to provide a method for determining a solar mask for a closure, shading or solar protection installation, as well as a method for checking compatibility of a motorized drive device for the closure, shading or solar protection installation, allowing a virtual increase of the field angles of a photographic instrument of a mobile terminal and to achieve a realistic compatibility checking diagnosis of the motorized drive device for the installation.

In this regard, the present invention relates, according to a first aspect, to a method for determining a solar mask for a closure, shading or solar protection installation, the method being carried out by means of a mobile terminal, the mobile terminal comprising at least:
   a controller,
   a photographic instrument, and
   an orientation detection device,
the method comprising at least the following steps:
   positioning the mobile terminal at a predetermined location of a photovoltaic panel of an autonomous electrical energy supply device, the autonomous electrical energy supply device being configured to supply an electromechanical actuator of a motorized drive device with electrical energy, in an assembled configuration of the installation,
   after the step of positioning the mobile terminal, acquiring a single photograph by means of the photographic instrument of the mobile terminal, and
   determining an orientation of the photographic instrument of the mobile terminal, during the step of acquiring the photograph, by means of the orientation detection device and the controller of the mobile terminal.

According to the invention, the method furthermore comprises at least the following steps:
   extending at least one contour of the photograph acquired, during the acquisition step, along at least one direction, by means of the controller of the mobile terminal, and
   superposing data of the photograph extended, during the extension step, with a solar path diagram, in a common reference frame, so as to determine a solar mask at the predetermined location of the photovoltaic panel.

Thus, such a method for determining the solar mask for the installation allows a virtual increase of the field angles of the photographic instrument of the mobile terminal by extending one or more edges of the photograph acquired.

In this way, the method makes it possible to determine the solar mask facing the photovoltaic panel of the autonomous electrical energy supply device configured to supply the electromechanical actuator of the motorized drive device with electrical energy, while making a realistic hypothesis about an environment of the photovoltaic panel which is outside the photograph acquired.

Consequently, the determination of the solar mask facing the photovoltaic panel makes it possible to make an estimate of the solar energy supplies on the photovoltaic panel at the predetermined location, in the assembled configuration of the installation.

Furthermore, the method for determining the solar mask for the installation is carried out by means of the mobile terminal and, in particular, the photographic instrument and the orientation detection device of the mobile terminal, so as to make it possible to estimate the solar energy supplies on the photovoltaic panel at the predetermined location, in the assembled configuration of the installation.

According to one advantageous characteristic of the invention, the step of extending at least one contour of the photograph acquired, during the acquisition step, is carried out along a plurality of directions, by means of the controller of the mobile terminal.

According to another advantageous characteristic of the invention, the directions of extension of at least one contour of the photograph acquired, during the acquisition step, are the top, the left and the right of the photograph.

According to another advantageous characteristic of the invention, the method comprises a step of projecting data of the photograph extended, during the extension step, into a projection reference frame, as a function of at least one orientation of the photographic instrument of the mobile terminal determined, during the orientation determination step, the projection step being carried out after the extension step and before the superposition step. Furthermore, the superposition step is carried out on the basis of data of the photograph projected, during the projection step, onto the solar path diagram.

According to another advantageous characteristic of the invention, the projection reference frame of the photograph extended, during the extension step, is a spherical celestial arch reference frame.

According to another advantageous characteristic of the invention, the step of projecting the photograph extended, during the extension step, is also carried out as a function of a focal length of a lens of the photographic instrument of the mobile terminal.

According to another advantageous characteristic of the invention, the step of projecting the photograph extended, during the extension step, is also carried out as a function of dimensions of an image sensor of the photographic instrument of the mobile terminal.

According to another advantageous characteristic of the invention, the method furthermore comprises a step of determining at least one sky region on the basis of the photograph acquired, during the acquisition step, by image processing, by means of the controller of the mobile terminal.

The present invention relates, according to a second aspect, to a method for checking compatibility of a motorized drive device for a closure, shading or solar protection installation, the installation comprising at least:
  a shading device, the shading device comprising at least one screen,
  a motorized drive device, the screen being configured to be moved between an open position and a closed position by means of the motorized drive device, the motorized drive device comprising at least:
  an electromechanical actuator, and
  an autonomous electrical energy supply device, the autonomous electrical energy supply device comprising at least one photovoltaic panel and at least one electrical energy storage device, the autonomous electrical energy supply device being configured to supply the electromechanical actuator with electrical energy, the method being carried out by means of a mobile terminal, the mobile terminal comprising at least:
  a controller,
  a photographic instrument, and
  an orientation detection device, the method comprising at least the following steps:
  selecting the electromechanical actuator from a list of electromechanical actuators or inputting an identifier of the electromechanical actuator,
  selecting the photovoltaic panel from a list of photovoltaic panels or inputting an identifier of the photovoltaic panel,
  selecting the electrical energy storage device from a list of electrical energy storage devices or inputting an identifier of the electrical energy storage device, and
  determining a geographical localization of the installation.

According to the invention, the method furthermore comprises at least the following steps:
  determining a solar mask by a determination method according to the invention, as mentioned above, and
  checking compatibility of the motorized drive device as a function of the results of the steps of selecting or inputting the electromechanical actuator, the photovoltaic panel and the electrical energy storage device, of determining the geographical localization of the installation and of determining the solar mask.

This method for checking compatibility of the motorized drive device has characteristics and advantages similar to those described above in relation to the method for determining the solar mask for the closure, shading or solar protection installation according to the invention, as mentioned above.

Furthermore, such a method for checking compatibility of the motorized drive device makes it possible to provide a diagnosis relating to a possibility or lack of possibility of installing the motorized drive device equipped with the electromechanical actuator and the autonomous electrical energy supply device and, more particularly, the photovoltaic panel at the predetermined location, in the assembled configuration of the installation, after the determination of the solar mask, by the determination method, as mentioned above.

The present invention relates, according to a third aspect, to a mobile terminal comprising hardware and/or software elements configured to carry out:
  a method for determining a solar mask for a closure, shading or solar protection installation according to the invention, as mentioned above, and/or
  a method for checking compatibility of a motorized drive device for a closure, shading or solar protection installation according to the invention, as mentioned above.

Other features and advantages of the invention will become clearer in the following description.

In the appended drawings, which are given by way of nonlimiting examples:

FIG. 1 is a schematic view in cross section of an installation according to one embodiment of the invention;

FIG. 2 is a schematic perspective view of the installation illustrated in FIG. 1;

FIG. 3 is a partial schematic view in axial section of the installation illustrated in FIGS. 1 and 2, showing an electromechanical actuator of the installation;

FIG. 4 is a block diagram of an algorithm of a method according to the invention, for determining a solar mask for the installation illustrated in FIGS. 1 to 3;

FIG. 5 is an example of a result of image processing of a photograph acquired by a photographic instrument of a mobile terminal by the determination method illustrated in FIG. 4;

FIG. 6 is an example of a result of extension of the contours of the photograph acquired by means of a controller of the mobile terminal by the determination method illustrated in FIG. 4;

FIG. 7 is an example of a result of a projection of data of an extended photograph into a projection reference frame, in particular a celestial arch reference frame in spherical coordinates, by means of a controller of the mobile terminal by the determination method illustrated in FIG. 4;

FIG. 8 is an example of a result of a superposition of data of a projected photograph on a solar path diagram by means of a controller of the mobile terminal by the determination method illustrated in FIG. 4; and FIG. 9 is a block diagram of an algorithm of a method according to the invention, for checking compatibility of a motorized drive device for the installation illustrated in FIGS. 1 to 3.

First, with reference to FIGS. 1 and 2, a closure, shading or solar protection installation 100 according to the invention and installed in a building that has an opening 1, window or door, equipped with a screen 2 belonging to a shading device 3, in particular a motorized roller shutter, is described.

The shading device 3 may be a roller shutter, a blind made of canvas or with orientable slats, a rolling barrier, a gate, a door or a swing shutter. The present invention applies to all types of shading device.

Here, the installation 100 comprises the shading device 3.

A roller shutter according to one embodiment of the invention is described, with reference to FIGS. 1 and 2.

The screen 2 of the shading device 3 is wound up on the winding tube 4 driven by a motorized drive device 5. The screen 2 can move between a wound-up position, in particular a high position, and an unwound position, in particular a low position.

Here, the installation 100 comprises the motorized drive device 5.

The mobile screen 2 of the shading device 3 is a screen for closure, shading and/or solar protection, which is wound up on the winding tube 4, the inner diameter of which is substantially greater than the external diameter of an electromechanical actuator 11, so that the electromechanical actuator 11 can be inserted into the winding tube 4, during assembly of the shading device 3.

The motorized drive device 5 comprises the electromechanical actuator 11, in particular of the tubular type, making it possible to set the winding tube 4 in rotation, so as to move, in particular unwind or wind up, the screen 2 of the shading device 3.

The shading device 3 comprises the winding tube 4 for winding up the screen 2. In the mounted state, the electromechanical actuator 11 is inserted into the winding tube 4.

In the known way, the roller shutter, which forms the shading device 3, has an apron comprising horizontal slats which are articulated to one another, forming the screen 2 of the roller shutter 3, and guided by two lateral rails 6. These slats are contiguous when the apron 2 of the roller shutter 3 reaches its low unwound position.

In the case of a roller shutter, the high wound position corresponds to a final end slat 8, for example in the shape of an L, of the apron 2 of the roller shutter 3 bearing against an edge of a box 9 of the roller shutter 3 or the final end slat 8 being stopped in a programmed high end of travel position. Furthermore, the low unwound position corresponds to the final end slat 8 of the apron 2 of the roller shutter 3 bearing against a sill 7 of the opening 1 or the final end slat 8 being stopped in a programmed low end of travel position.

Here, the screen 2 is configured to be moved by means of the motorized drive device 5, between an open position, corresponding to the unwound position and which may also be referred to as the high end of travel position FdcH, and a closed position, corresponding to the unwound position and which may also be referred to as the low end of travel position FdcB.

The first slat of the roller shutter 3, opposite to the final end slat 8, is connected to the winding tube 4 by means of at least one articulation 10, in particular an attachment piece in the form of a belt.

The winding tube 4 is arranged inside the box 9 of the roller shutter 3. The apron 2 of the roller shutter 3 is wound up and unwound around the winding tube 4 and is accommodated at least partly inside the box 9.

In general, the box 9 is arranged above the opening 1, or alternatively in the upper part of the opening 1.

The motorized drive device 5 is controlled by a command unit. The command unit may, for example, be a local command unit 12.

The local command unit 12 may be connected by a wired or wireless link to a central command unit 13. The central command unit 13 manages the local command unit 12, as well as other similar local command units distributed throughout the building.

The motorized drive device 5 is, preferably, configured to carry out the commands for moving, in particular unwinding or winding up, the screen 2 of the shading device 3, which may be emitted, in particular, by the local command unit 12 or the central command unit 13.

The installation 100 comprises either the local command unit 12, or the central command unit 13, or the local command unit 12 and the central command unit 13.

The motorized drive device 5, including the electromechanical actuator 11, belonging to the installation 100 of FIGS. 1 and 2 is now described in more detail with reference to FIG. 3.

Advantageously, the electromechanical actuator 11 comprises an electric motor 16. The electric motor 16 comprises a rotor and a stator, not represented and positioned coaxially around an axis of rotation X, which is also the axis of rotation of the winding tube 4 in the mounted configuration of the motorized drive device 5.

Means for controlling the electromechanical actuator 11, making it possible to move the screen 2 of the shading device 3, consist of at least one electronic control unit 15. This electronic control unit 15 is capable of setting the electric motor 16 of the electromechanical actuator 11 in operation, and, in particular, of enabling the electrical energy supply of the electric motor 16.

Thus, the electronic control unit 15 controls, in particular, the electric motor 16, so as to open or close the screen 2, as described above.

The means for controlling the electromechanical actuator 11 comprise hardware and/or software means.

By way of nonlimiting example, the hardware means may comprise at least one microcontroller 31.

The electronic control unit 15 comprises at least one first communication module 27, in particular for receiving control instructions, the control instructions being emitted by an instruction emitter, such as the local command unit 12 or the central command unit 13, these instructions being intended to control the motorized drive device 5.

Preferably, the first communication module 27 of the electronic control unit 15 is of the wireless type. In particular, the first communication module 27 is configured to receive radio control instructions.

Advantageously, the first communication module 27 may also allow the reception of control instructions transmitted by wired means.

The electronic control unit 15, the local command unit 12 and/or the central command unit 13 may be in communication with a metrological station, not represented, situated outside the building, which includes, in particular, one or more sensors capable of being configured to determine, for example, a temperature, a luminosity or a wind speed.

The electronic control unit 15, the local command unit 12 and/or the central command unit 13 may also be in communication with a server 28, so as to supervise the electromechanical actuator 11 according to data made available remotely via a communication network, in particular an Internet network which may be connected to the server 28.

The electronic control unit 15 may be controlled on the basis of the local 12 or central 13 command unit. The local 12 or central 13 command unit is provided with a control keypad. The control keypad of the local 12 or central 13 command unit comprises one or more selection elements 14 and, optionally, one or more display elements 34.

By way of nonlimiting examples, the selection elements may comprise push-buttons and/or touch-sensitive keys. The display elements may comprise light-emitting diodes and/or an LCD (Liquid-Crystal Display) or TFT (Thin-Film Transistor) display. The selection and display elements may also be produced by means of a touch screen.

The local 12 or central 13 command unit comprises at least one second communication module 36.

Thus, the second communication module 36 of the local 12 or central 13 command unit is configured to emit, in other words emits, control instructions, in particular by wireless means, for example radio, or by wired means.

Furthermore, the second communication module 36 of the local 12 or central 13 command unit may also be configured to receive, in other words receives, control instructions, in particular via the same means.

The second communication module 36 of the local 12 or central 13 command unit is configured to communicate, in other words communicates, with the first communication module 27 of the electronic control unit 15.

Thus, the second communication module 36 of the local 12 or central 13 command unit exchanges control instructions with the first communication module 27 of the electronic control unit 15, either unidirectionally or bidirectionally.

Advantageously, the local command unit 12 is a control point, that may be fixed or mobile. A fixed control point may be a control box intended to be fixed on a facade of a wall of the building or on a face of a frame of a window or a door. A mobile control point may be a remote control, a Smartphone or a tablet.

Advantageously, the local 12 or central 13 command unit also comprises a controller 35.

The motorized drive device 5, in particular the electronic control unit 15, is, preferably, configured to carry out control instructions for moving, in particular for closing as well as opening, the screen 2 of the shading device 3. These control instructions may be emitted, in particular, by the local command unit 12 or by the central command unit 13.

The motorized drive device 5 may be controlled by the user, for example by the reception of a control instruction corresponding to pressing on the selection element or one of the selection elements 14 of the local 12 or central 13 command unit.

The motorized drive device 5 may also be controlled automatically, for example by the reception of a control instruction corresponding to at least one signal coming from at least one sensor and/or to a signal coming from a clock of the electronic control unit 15, in particular the microcontroller 31. The sensor and/or the clock may be integrated with the local 12 or with the central 13 command unit.

The motorized drive device 5 comprises an autonomous electrical energy supply device 26.

The autonomous electrical energy supply device 26 comprises at least one photovoltaic panel 25 and at least one electrical energy storage device 24.

The autonomous electrical energy supply device 26 is configured to supply the electromechanical actuator 11 with electrical energy.

Thus, the autonomous electrical energy supply device 26 makes it possible to supply the electromechanical actuator 11 with electrical energy, without itself being electrically connected to an electrical supply network of the mains.

Here, the photovoltaic panel 25 is electrically connected to the electrical energy storage device 24.

The electromechanical actuator 11 is electrically connected to the autonomous electrical energy supply device 26 and, more particularly, to the electrical energy storage device 24. Preferably, the electromechanical actuator 11 is electrically connected to the autonomous electrical energy supply device 26 and, more particularly, to the electrical energy storage device 24 by means of at least one electrical supply cable 18, so as to make it possible to supply the electromechanical actuator 11 with electrical energy from the autonomous electrical energy supply device 26.

The electronic control unit 15 is electrically connected to the autonomous electrical energy supply device 26 and, more particularly, to the electrical energy storage device 24.

Advantageously, the electrical energy storage device 24 comprises at least one battery 32.

Advantageously, the battery 32 comprises at least one electrical energy storage element, not represented.

Here, the battery 32 comprises a plurality of electrical energy storage elements. Preferably, the electrical energy storage elements are electrically connected in series.

The number of electrical energy storage elements of the battery is not limiting.

Advantageously, the electrical energy storage device 24 is of the rechargeable type and is configured to supply the electromechanical actuator 11 with electrical energy. Furthermore, the electrical energy storage device 24 is configured to be supplied with electrical energy by the photovoltaic panel 25.

Thus, the recharging of the electrical energy storage device 24 is carried out by solar energy, by means of the photovoltaic panel 25.

In this way, the electrical energy storage device 24 may be recharged without having to dismantle a part of the box 9 of the shading device 3.

The photovoltaic panel 25 comprises at least one photovoltaic cell and, more particularly, a plurality of photovoltaic cells.

The motorized drive device 5, in particular the photovoltaic panel 25, comprises charging elements configured to charge the battery 32 of the electrical energy storage device 24 from the solar energy recovered by the photovoltaic panel 25.

Thus, the charging elements configured to charge the battery 32 of the electrical energy storage device 24 from the solar energy make it possible to convert the solar energy recovered by the photovoltaic panel 25 into electrical energy.

As a variant or in addition, the motorized drive device 5, in particular the electromechanical actuator 11, is supplied with electrical energy by means of the battery 32 or from an electrical supply network of the mains, in particular by the commercial AC network, in particular as a function of a state of charge of the battery 32.

A casing 17 of the electromechanical actuator 11 is, preferably, of cylindrical shape.

In one embodiment, the casing 17 is made from a metallic material.

The material of the casing of the electromechanical actuator is not limiting and may be different. It may, in particular, be a plastic material.

Advantageously, the electromechanical actuator 11 also comprises a gearbox 19, a brake 29 and an output shaft 20.

Advantageously, the gearbox 19 comprises at least one reduction stage. The reduction stage may be a gear train of the epicyclic type.

The type and the number of reduction stages of the gearbox are not limiting. The number of reduction stages may be greater than or equal to two.

By way of nonlimiting example, the brake 29 may be a spring brake, a cam brake or an electromagnetic brake.

The electromechanical actuator 11 may also comprise an end of travel and/or obstacle detection device, which may be mechanical or electronic.

Advantageously, the electric motor 16, the brake 29 and the gearbox 19 are mounted inside the casing 17 of the electromechanical actuator 11.

The winding tube 4 is driven in rotation around the axis of rotation X and the casing 17 of the electromechanical actuator 11 while being supported via two pivot links. The first pivot link is produced at a first end of the winding tube 4 by means of a ring 30 inserted around a first end 17a of the casing 17 of the electromechanical actuator 11. The ring 30 thus makes it possible to produce a bearing. The second pivot ring, not represented in FIG. 3, is produced at a second end, not visible in this figure, of the winding tube 4.

Advantageously, the electromechanical actuator 11 comprises a torque support 21. The torque support 21 projects at the first end 17a of the casing 17 of the electromechanical actuator 11, in particular the end 17a of the casing 17 that receives the ring 30. The torque support 21 of the electromechanical actuator 11 thus makes it possible to fix the electromechanical actuator 11 on a framework 23, in particular a side wall of the box 9.

Furthermore, the torque support 21 of the electromechanical actuator 11 may make it possible to close off the first end 17a of the casing 17.

Moreover, the torque support 21 of the electromechanical actuator 11 may make it possible to support the electronic control unit 15. The electronic control unit 15 may be supplied with electrical energy by means of the electrical supply cable 18.

Here, and as illustrated in FIG. 3, the electronic control unit 15 is thus arranged, in other words integrated, inside the casing 17 of the electromechanical actuator 11.

In a variant, not represented, the electronic control unit 15 is arranged outside the casing 17 of the electromechanical actuator 11 and, in particular, mounted on the framework 23 or in the torque support 21.

Advantageously, the output shaft 20 of the electromechanical actuator 11 is arranged inside the winding tube 4 and at least partially outside the casing 17 of the electromechanical actuator 11.

Advantageously, one end of the output shaft 20 projects relative to the casing 17 of the electromechanical actuator 11, in particular relative to a second end 17b of the casing 17 opposite to the first end 17a.

Advantageously, the output shaft 20 of the electromechanical actuator 11 is configured to drive in rotation a link element 22 connected to the winding tube 4. The link element 22 is produced in the form of a wheel.

When the electromechanical actuator 11 is set in operation, the electric motor 16 and the gearbox 19 drive the output shaft 20 in rotation. Furthermore, the output shaft 20 of the electromechanical actuator 11 drives the winding tube 4 in rotation via the link element 22.

Thus, the winding tube 4 drives the screen 2 of the shading device 3 in rotation, so as to open or close the opening 1.

An embodiment of a method for determining a solar mask M for the closure, shading or solar protection installation 100 according to the invention, represented in FIGS. 1 to 3, is now described with reference to FIGS. 4 to 8.

The solar mask M is determined on the basis of one or more obstacles arranged in front of the photovoltaic panel 25 and capable of casting a shadow thereon in relation to the sun, in the assembled configuration of the installation 100, at a given time, in particular during one year. This obstacle or these obstacles may, for example, be a building, which may, in particular, be a house or an apartment block, vegetation, which may, in particular, be a bush or a tree, a relief of the landscape around the installation 100, which may, in particular, be a mountain. This obstacle or these obstacles defining the solar mask M may reduce, or prevent, production of electrical energy by the photovoltaic panel 25 as a function of energy supplies coming from the sun.

The method is carried out by means of a mobile terminal 33.

Here, the mobile terminal 33 may be the local command unit 12 and comprise all or some of its constituent elements.

Preferably, the mobile terminal 33 is a Smartphone.

As a variant, the mobile terminal 33 may be a touch-sensitive tablet or a configuration tool.

The mobile terminal 33 may thus be any mobile apparatus configured to carry out the method for determining the solar mask M for the installation 100.

The mobile terminal 33 comprises at least the controller 35, a photographic instrument 37 and an orientation detection device 38.

Advantageously, the photographic instrument 37 of the mobile terminal 33 is a camera.

Advantageously, the photographic instrument 37 of the mobile terminal 33 comprises an image sensor, not represented.

Advantageously, the image sensor of the photographic instrument 37 of the mobile terminal 33 is a CCD (Charge Coupled Device) sensor. Furthermore, the image sensor of the photographic instrument 37 of the mobile terminal 33 is configured to convert light signals into electrical signals.

Advantageously, the orientation detection device 38 of the mobile terminal 33 comprises a gyroscope.

As a variant, the orientation detection device 38 of the mobile terminal 33 comprises a magnetometer, which may be combined with an accelerometer and/or with a gyroscope.

Advantageously, the mobile terminal 33 furthermore comprises a satellite positioning system 39.

Here, the mobile terminal 33 comprises the second communication module 36, as described above with reference to the local command unit 12, as well as the selection 14 and display 34 elements.

Advantageously, the method is carried out by an application of the mobile terminal 33.

The method comprises a step E10 of positioning the mobile terminal 33 at a predetermined location of the photovoltaic panel 25, in an assembled configuration of the installation 100.

Here, the predetermined location of the photovoltaic panel 25 corresponds to a location where the photovoltaic panel 25 is to be positioned in the installation 100 in order to allow the motorized drive device 5 and, more particularly, the electromechanical actuator 11 to be supplied with electrical energy.

Thus, the step E10 of positioning the mobile terminal 33 consists in putting the mobile terminal 33 at the place where the photovoltaic panel 25 is intended to be installed, in the assembled configuration of the installation 100.

In this way, the predetermined location of the photovoltaic panel 25 corresponds to a location from which the solar mask M is intended to be determined in order to make it possible to check compatibility of the motorized drive device 5 as a function of the solar energy supplies delivered to the photovoltaic panel 25 at a given time and, more particularly, during the year.

Following the step E10 of positioning the mobile terminal 33, the method comprises a step E20 of acquiring a photograph P by means of the photographic instrument 37 of the mobile terminal 33. Data defining this photograph P acquired, during the step E20, are stored in a memory of the controller 35 of the mobile terminal 33.

The method comprises a step E30 of determining an orientation of the photographic instrument 37 of the mobile terminal 33, during the step E20 of acquiring the photograph P, by means of the orientation detection device 38 and the controller 35 of the mobile terminal 33.

Thus, the step E30 of determining the orientation of the photographic instrument 37 of the mobile terminal 33 makes it possible to determine an orientation of the photographic instrument 37 of the mobile terminal 33 with respect to a cardinal reference frame R and, optionally, an inclination of the photographic instrument 37 of the mobile terminal 33 with respect to the ground and/or an attitude of the photographic instrument 37 of the mobile terminal 33, that is to say a rotation with respect to each of the axes X, Y, Z of a three-dimensional reference frame.

Preferably, in this step E30, the method may also make it possible to determine a geographical localization of the mobile terminal 33, during the step E20 of acquiring the photograph P, by means of a localization device of the mobile terminal 33, in particular by means of the satellite positioning device 39. This localization may also be that of the installation 100.

The method comprises a step E40 of extending the contours of the photograph P acquired, during the step E20, along at least one direction, by means of the controller 35 of the mobile terminal 33. An example of a result of extension of the contours of the photograph P is illustrated in FIG. 6.

Thus, the extension step E40 consists in extending the result of the step E20 of acquiring the photograph P, along at least one direction. An extended photograph Pe is then obtained.

Here, the extension step E40 consists in extrapolating the contours of the photograph P acquired, during the step E20, along at least one direction, by means of the controller 35 of the mobile terminal 33, while making an hypothesis that an environment outside the field of the photographic instrument 37 of the mobile terminal 33 is similar to the contours of the photograph P.

The method furthermore comprises a step E60 of superposing data of the photograph Pe extended, during the step E40, with a solar path diagram S, in a common reference frame R, V, so as to determine a solar mask M at the predetermined location of the photovoltaic panel 25.

The solar path diagram S, also referred to as a solar diagram, is a diagram indicating, at different times of the year, an angular height, also referred to as an angle height or elevation height, of the sun and an azimuth direction of the sun for a given latitude. The solar path diagram S thus makes it possible to define a trajectory of the sun as perceived at the predetermined location of the photovoltaic panel 25 for different times, during the year. In this way, the solar path diagram S makes it possible to define times during which incident direct solar radiation exists at the predetermined location of the photovoltaic panel 25, in particular under meteorological conditions in which the sky is clear and in the absence of obstacles to the solar radiation.

The solar path diagram S illustrated in FIG. 8 is an example of a graphical representation for a given latitude and longitude. Each curve represents an apparent course of the sun as a function of an hour for a determined date of the year.

The solar mask M, also referred to as a shadow mask, is thus a representation of elements that, along the direction defined on the abscissa and on the ordinate, cast a shadow at the predetermined location of the photovoltaic panel 25, in the assembled configuration of the installation 100.

Such a method for determining the solar mask M for the installation 100 allows a virtual increase of the field angles of the photographic instrument 37 of the mobile terminal 33 by extending one or more edges of the photograph P acquired.

In this way, the method makes it possible to determine the solar mask M facing the photovoltaic panel 25 of the autonomous electrical energy supply device 26 configured to supply the electromechanical actuator 11 of the motorized drive device 5 with electrical energy, while making a maximally plausible hypothesis about an environment of the photovoltaic panel 25 which is outside the photograph P acquired, during the step E20.

Consequently, the determination of the solar mask M facing the photovoltaic panel makes it possible to make an estimate of the solar energy supplies on the photovoltaic panel 25 at the predetermined location, in the assembled configuration of the installation 100.

Furthermore, the method for determining the solar mask M for the installation 100 is carried out by means of the mobile terminal 33 and, in particular, the photographic instrument 37 and the orientation detection device 38 of the mobile terminal 33, so as to make it possible to estimate the solar energy supplies on the photovoltaic panel 25 at the predetermined location, in the assembled configuration of the installation 100.

Moreover, the superposition of the data of the extended photograph Pe, corresponding to the result of the step E40 of extending the photograph P acquired, during the step E20, with the solar path diagram S, in the common reference frame R, V, makes it possible to determine at any time, in particular during the year, whether or not the sun is visible at the predetermined location of the photovoltaic panel 25.

Here, the application of the mobile terminal 33 makes it possible to determine the solar mask M for the installation 100.

In order to carry out the superposition step E60, the data of the extended photograph Pe and the data of the path diagram S are expressed in the same reference frame, in other words in the common reference frame R, V.

Such a common reference frame may, in particular, be a cardinal reference frame R, a three-dimensional reference frame centered on a midpoint of the image sensor of the photographic instrument 37 of the mobile terminal 33, a three-dimensional reference frame centered on a focal point of the lens of the photographic instrument 37 of the mobile terminal 33, or a spherical celestial arch reference frame, also referred to below as the projection reference frame V.

Here, the method comprises a step of determining the solar path diagram S, not represented, in particular as a function of a result of the step E30 of determining the orientation of the photographic instrument 37 of the mobile terminal 33.

Advantageously, the method comprises a step E50 of projecting data of the photograph Pe extended, during the step E40, into a projection reference frame V, as a function of at least the orientation of the photographic instrument 37 of the mobile terminal 33 determined, during the step E30. The projection step E50 is carried out after the extension step E40 and before the superposition step E60. An example of a result of the projection of the data of the extended photograph Pe into the projection reference frame V is illustrated in FIG. 7.

Thus, the step E50 of projecting the data of the extended photograph Pe consists in projecting the result of the step E40 of extending the contours of the photograph P acquired, during the step E20, by image processing, into the projection reference frame V.

Furthermore, the step E50 of projecting the data of the extended photograph Pe is carried out as a function of data determined by the orientation detection device 38 of the mobile terminal 33 at the moment of the acquisition of the photograph P, during the step E20, which may be angles defining, in particular, a precession, in other words a pitch, a nutation, in other words a roll, and an intrinsic rotation, in other words a yaw. Such angles are commonly referred to as the Euler angles.

Here, the projection step E50 corresponds to a step of changing the reference frame of the data of the extended photograph Pe, in particular from the cardinal reference frame R to the projection reference frame V and, more particularly, from a three-dimensional reference frame centered on a midpoint of the image sensor of the photographic instrument 37 of the mobile terminal 33 to the projection reference frame V.

Here, the solar path diagram S is determined in the projection reference frame V.

Advantageously, the projection reference frame V is a reference frame in which angular coordinates of azimuth and elevation are represented. In FIG. 7, the azimuth is represented on the abscissa and the elevation is represented on the ordinate.

Advantageously, the projection reference frame V of the photograph Pe extended, during the step E40, is a spherical celestial arch reference frame.

The so-called Euler angles make it possible to express in spherical coordinates, in particular in the projection reference frame V, the orientation of an element, in particular of the photographic instrument 37 of the mobile terminal 33, with respect to a Cartesian reference frame, in other words a three-dimensional reference frame, in particular the cardinal reference frame R.

Here, for each direction starting from the predetermined location of the photovoltaic panel 25, in the projection reference frame V, an azimuth angle is assimilated with an intrinsic rotation angle in the cardinal reference frame R and an elevation angle is assimilated with a precession angle in the cardinal reference frame R.

In this case, the superposition step E60 is carried out on the basis of data of the photograph Pp projected, during the step E50, onto the solar path diagram S. Here, the data of the projected photograph Pp are obtained on the basis of the data of the photograph Pe extended, during the step E40. An example of a result of the superposition of the data of the projected photograph Pp onto the solar path diagram S is illustrated in FIG. 8.

Thus, the superposition of the data of the projected photograph Pp, corresponding to the result of the step E50 of projecting the data of the extended photograph Pe, onto the solar path diagram S makes it possible to determine at any time, in particular during the year, whether or not the sun is visible at the predetermined location of the photovoltaic panel 25.

The step E20 of acquiring the photograph P consists in acquiring a single photograph P.

Thus, the solar mask M is determined by means of a single photograph acquired, during the step E20.

In this way, such a method for determining the solar mask M for the installation 100 makes it possible to obviate the acquisition of a plurality of contiguous photographs by means of the photographic instrument 37 of the mobile terminal 33.

Furthermore, such a method for determining the solar mask M for the installation 100 makes it possible to obviate a lens of the hypergonar type, also referred to as a fisheye, for the photographic instrument 37 of the mobile terminal 33, so as to minimize the costs of the mobile terminal 33 needed for carrying out the method.

Consequently, the method is simplified and, more particularly, the ergonomics of the application of the mobile terminal 33 are improved.

Advantageously, the step E50 of projecting the data of the photograph Pe extended, during the step E40, is also carried out as a function of a focal length of a lens of the photographic instrument 37 of the mobile terminal 33.

Advantageously, the step E50 of projecting the data of the photograph Pe extended, during the step E40, is also carried out as a function of dimensions of the image sensor of the photographic instrument 37 of the mobile terminal 33, in other words the horizontal and vertical field angles of the photographic instrument 37 of the mobile terminal 33.

In one exemplary embodiment, the step E50 of projecting the data of the photograph Pe extended, during the step E40, into the projection reference frame V comprises a first sub-step of transferring data of the extended photograph Pe from a first three-dimensional reference frame centered on a midpoint of the image sensor of the photographic instrument 37 of the mobile terminal 33 to a second three-dimensional reference frame centered on a focal point of the lens of the photographic instrument 37 of the mobile terminal 33. This first sub-step of the projection step E50 requires beforehand a step of input and a step of storage by the controller 35 of the mobile terminal 33 of the focal length of the lens of the photographic instrument 37 of the mobile terminal 33 and of the dimensions of the image sensor of the photographic instrument 37 of the mobile terminal 33. This first sub-step of the projection step E50 thus makes it possible to obtain a result comprising three matrices, each expressing one coordinate of each pixel of the extended photograph Pe along the axes X, Y, Z of the second three-dimensional reference frame. Furthermore, the step E50 of projecting the data of the photograph Pe extended, during the step E40, into the projection reference frame V comprises a second sub-step of transferring the result of the first sub-step of the projection step E50 from the second three-dimensional reference frame to the projection reference frame V centered on the focal point of the lens of the photographic instrument 37 of the mobile terminal 33. This second sub-step of the projection step E50 requires beforehand of determining each so-called Euler angle, during the step E30, by the orientation detection device 38 of the mobile terminal 33 at the moment of the acquisition of the photograph P, during the step E20, and of applying so-called Euler rotation matrices for each of these angles, by means of the controller 35 of the mobile terminal 33. This second sub-step of the projection step E50 thus makes it possible to obtain a result comprising two matrices, each expressing one coordinate of each pixel of the extended photograph Pe according to the elevation and azimuth angles of the projection reference frame V.

Advantageously, the step E40 of extending the contours of the photograph P acquired, during the step E20, is carried out along a plurality of directions, by means of the controller 35 of the mobile terminal 33.

Thus, the extension step E40 makes it possible to make a realistic hypothesis about an environment of the photovoltaic panel 25 which is outside the photograph P acquired, during the step E20, even though the field angles of the photographic instrument 37 of the mobile terminal 33 are limited.

Advantageously, the directions of extension of the contours of the photograph P acquired, during the step E20, are the top, the left and the right of the photograph P.

Thus, the extension step E40 makes it possible to make a realistic hypothesis about an environment of the photovoltaic panel 25 which is outside the photograph P acquired, during the step E20, in privileged directions excluding the below of the photograph P, since no information is desired at ground level.

Advantageously, the step E20 of acquiring the photograph P is carried out while inclining the mobile terminal 33 upward relative to the ground, so that the bottom of the field of the lens of the photographic instrument 37 of the mobile terminal 33 corresponds to the horizon.

Thus, the entire vertical field of the lens of the photographic instrument 37 of the mobile terminal 33 is used above the horizon, during the step E20 of acquiring the photograph P.

In this way, the extension of the contours of the photograph P acquired, during the step E20, downward of the photograph P is of no interest, since no information is desired at ground level.

Advantageously, the step E40 of extending the contours of the photograph P acquired, during the step E20, is carried out by means of software loaded by the controller of the mobile terminal 33 and, more particularly, one or more image processing libraries.

In one exemplary embodiment, the photograph P acquired, during the step E20, is divided into rows and columns by means of the controller 35 of the mobile terminal 33. A height of the rows and a width of the columns are predetermined by the controller 35 of the mobile terminal 33. Preferably, the height of each row is identical and the width of each column is identical. For example, each row is a row of pixels. Furthermore, each column is a column of pixels. In order to extend the contour of the photograph P acquired, during the step E20, to the top by a number m of rows, the controller 35 of the mobile terminal 33 copies a first row of pixels of the photograph P as many times as the number m of rows then inserts these rows before the first row. In order to extend the contour of the photograph P acquired, during the step E20, to the left by a number n of columns, the controller 35 of the mobile terminal 33 copies a first column of pixels of the photograph P as many times as the number n of columns then inserts these columns before the first column. In order to extend the contour of the photograph P acquired, during the step E20, to the right by a number p of columns, the controller 35 of the mobile terminal 33 copies a last column of pixels of the photograph P as many times as the number p of columns then inserts these columns after the last column. As an alternative, in order to extend one or more contours of the photograph P acquired, during the step E20, the controller 35 of the mobile terminal 33 may not copy a last row or column of pixels of the photograph P identically several times, but may take into account the variation of the distribution of the colors of the pixels in the vicinity of the contour, in particular over a plurality of rows or columns neighboring the last row or column.

The number m of rows and the numbers n and p of columns may be identical or different.

Advantageously, the method comprises a step E70 of determining at least one sky region C on the basis of the photograph P acquired, during the step E20, by image processing, by means of the controller 35 of the mobile terminal 33. An example of a result of the image processing of the photograph P is illustrated in FIG. 5.

Advantageously, the image processing for determining the sky region or regions C, on the basis of the photograph P acquired, during the step E20, consists in carrying out a binary segmentation of the photograph P in order to separate the sky region or regions C from the other elements of the photograph P.

In one exemplary embodiment, such a binary segmentation of the photograph P consists in evaluating a radiometry, in particular of the RGB type (Red, Green, Blue), of the pixels of the photograph P, so as to determine a luminosity of each pixel of the photograph P, and in determining luminosity gradients for each column of the photograph P. When the luminosity gradient is high and, in particular, greater than a predetermined threshold, it may correspond to a boundary between the sky region C and another element of the photograph P.

Advantageously, the step E70 of determining the sky region C is carried out by means of software loaded by the controller 35 of the mobile terminal 33.

Advantageously, the photograph P acquired, during the step E20, may be converted into a black-and-white image. For example, the pixels of the image representing the sky region C are converted into white pixels and all the other pixels are converted into black pixels.

Advantageously, the extension step E40 is carried out after the step E70 of determining the sky region C.

Preferably, the step E50 of projecting the data of the photograph Pe extended, during the step E40, is carried out as a function of the orientation of the photographic instrument 37 of the mobile terminal 33 determined, during the step E30, the focal length of the lens of the photographic instrument 37 of the mobile terminal 33, the dimensions of the image sensor of the photographic instrument 37 of the mobile terminal 33 and at least one so-called Euler angle determined by the orientation detection device 38 of the mobile terminal 33 at the moment of the acquisition of the photograph P, during the step E20. The at least one of the so-called Euler angles to be taken into consideration is, in particular, at least one of the angles referred to as intrinsic rotation, precession and nutation and, preferably, all the so-called Euler angles.

An embodiment of a method for checking compatibility of the motorized drive device for the closure, shading or solar protection installation 100 according to the invention and represented in FIGS. 1 to 3 is now described, with reference to FIG. 9.

The method for checking compatibility of the motorized drive device 5 for the installation 100 makes it possible to check whether the predetermined location of the photovoltaic panel 25 is situated at a place of the installation 100 which is suitable so that the photovoltaic panel 25 receives a sufficient quantity of solar energy, during the year, so as to supply the motorized drive device 5 and, more particularly, the electromechanical actuator 11 with electrical energy. Such a compatibility check of the motorized drive device for the installation 100 is intended to check that the photovoltaic panel 25 is capable of delivering a sufficient quantity of electrical energy to carry out a minimum number of control instructions received by the first communication module 27 of the electronic control unit 15, every day during the year.

Advantageously, the method is carried out by an application of the mobile terminal 33, in particular the same application of the mobile terminal 33 as the one carrying out the method for determining the solar mask M for the installation 100.

Here, the application of the mobile terminal 33 makes it possible to check the compatibility of the motorized drive device 5 for the installation 100.

The method comprises a step E100 of selecting the electromechanical actuator 11 from a list of electromechanical actuators or inputting an identifier of the electromechanical actuator 11.

Advantageously, the method comprises a step E110 of recording the selected or inputted electromechanical actuator 11 in a memory of the controller 35 of the mobile terminal 33.

The method comprises a step E120 of selecting the photovoltaic panel 25 from a list of photovoltaic panels or inputting an identifier of the photovoltaic panel 25.

Advantageously, the method comprises a step E130 of recording the selected or inputted photovoltaic panel 25 in a memory of the controller 35 of the mobile terminal 33.

The method comprises a step E140 of selecting the electrical energy storage device 24 from a list of electrical energy storage devices 24 or inputting an identifier of the electrical energy storage device 24.

Advantageously, the method comprises a step E150 of recording the selected or inputted electrical energy storage device 24 in a memory of the controller 35 of the mobile terminal 33.

Advantageously, each selection or input step E100, E120, E140 is carried out via the selection 14 and display 34 elements of the mobile terminal 33 or by reading an optical label, for example a barcode or a QR code, by means of the photographic instrument 37 of the mobile terminal 33, or by reception of a radio label, by means of the second communication module 36 of the mobile terminal 33, for example an RFID (Radio Frequency Identification) or NFC (Near Field Communication) label.

Advantageously, each list is stored in a memory of the controller 35 of the mobile terminal 33 or in a memory of the server 28 configured to communicate with the mobile terminal 33.

Advantageously, the method comprises a step E160 of inputting one or more data relating to the shading device 3 and/or the opening 1 and/or the window or the door arranged inside the opening 1. These data may, for example, be dimensions, materials or thermal energy transmission coefficients.

Advantageously, the input step E160 is carried out via selection 14 and display 34 elements of the mobile terminal 33.

The method furthermore comprises a step E170 of determining a geographical localization of the installation 100.

Advantageously, the step E170 of determining the geographical localization of the installation 100 is carried out via the satellite positioning device 39 of the mobile terminal 33 and/or selection 14 and display 34 elements of the mobile terminal 33 and/or data transmitted by the server 28 to the second communication module 36 of the mobile terminal 33.

The method comprises a step E180 of determining the solar mask M by the determination method described above.

The method furthermore comprises a step E190 of checking compatibility of the motorized drive device 5 as a function of the results of the steps of selecting or inputting E100, E120, E140, E160, of determining E170 the geographical localization of the installation 100 and of determining E180 the solar mask M.

Thus, the method for checking compatibility of the motorized drive device 5 makes it possible to provide a diagnosis relating to a possibility or lack of possibility of installing the motorized drive device 5 equipped with the electromechanical actuator 11 and the autonomous electrical energy supply device 26 and, more particularly, with the photovoltaic panel 25 at the predetermined location, in the assembled configuration of the installation 100, after the determination of the solar mask M, according to the determination method, as mentioned above. For example, the diagnosis is positive if it seems that the photovoltaic panel 25 installed at the predetermined location will be exposed, during a predetermined period, to a direct solar radiation for a duration greater than a duration threshold value. Furthermore, the diagnosis is negative in the converse case.

Thanks to the present invention, the method for determining the solar mask for the installation allows a virtual increase of the field angles of the photographic instrument of the mobile terminal by extending one or more edges of the photograph acquired.

In this way, the method makes it possible to determine the solar mask facing the photovoltaic panel of the autonomous electrical energy supply device configured to supply the electromechanical actuator of the motorized drive device with electrical energy, while making a realistic hypothesis about an environment of the photovoltaic panel which is outside the photograph acquired.

Numerous modifications may be made to the exemplary embodiments described above without departing from the scope of the invention as defined by the claims.

As a variant, not represented, the superposition step E60 may be carried out according to a different process. In such a case, before the superposition step E60, the method comprises a step of determining the solar path diagram S in the spherical celestial arch reference frame. Then, the superposition step E60 comprises a first sub-step of transferring data of the solar path diagram S from the spherical celestial arch reference frame to the three-dimensional reference frame centered on a focal point of the lens of the photographic instrument 37 of the mobile terminal 33, which may also be referred to as first three-dimensional reference frame. The superposition step E60 comprises a second sub-step of transferring the result of the first sub-step of the superposition step E60 to the three-dimensional reference frame centered on a midpoint of the image sensor of the photographic instrument 37 of the mobile terminal 33, which may also be referred to as second three-dimensional reference frame. Furthermore, the superposition step E60 comprises a third sub-step of superposing data of the photograph Pe extended, during the step E40, with the solar path diagram S previously determined, in the three-dimensional reference frame centered on a midpoint of the image sensor of the photographic instrument 37 of the mobile terminal 33, which is also referred to as common reference frame and may also be the cardinal reference frame R. This second sub-step of the superposition step E60 requires beforehand a step of input and a step of storage by the controller 35 of the mobile terminal 33 of the focal length of the lens of the photographic instrument 37 of the mobile terminal 33 and of the dimensions of the image sensor of the photographic instrument 37 of the mobile terminal 33. In this case, the superposition step E60, in particular the first and second sub-steps of the superposition step E60, are carried out as a function of the focal length of a lens of the photographic instrument 37 of the mobile terminal 33 and/or of the dimensions of the image sensor of the photographic instrument 37 of the mobile terminal 33.

As a variant, in order to improve the determination of the sky region C, during the step E70, on the basis of the photograph P acquired, during the step E20, the method may comprise a step of optimizing at least one parameter of the acquisition of the photograph P, during the step E20 and, more particularly, of the photographic instrument 37 of the mobile terminal 33. The parameter or parameters of the acquisition of the photograph P may, for example, be the contrast or the balance of the whites in the photograph P. Such an optimization step may, for example, comprise a first sub-step of acquiring a test photograph and a second sub-step of determining at least one optimal parameter of the acquisition of the photograph P on the basis of the test photograph. This optimization step is carried out after the positioning step E10 and before the step E20 of acquiring the photograph P. Thus, the photograph P is acquired, during the step E20, by applying the optimal parameter or parameters determined during the optimization step.

As a variant, in order to improve the determination of the sky region C, during the step E70, on the basis of the photograph P acquired, during the step E20, the method may comprise a step of positioning a cursor on the display element 34 of the mobile terminal 33, in particular a touch screen of the mobile terminal 33, at level with a sky region C visible on the photograph P, via one of the selection elements 14 of the mobile terminal 33.

Moreover, the compatibility checking method may furthermore comprise a step of determining meteorological data, so as to estimate solar radiation at the predetermined location of the photovoltaic panel 25.

Advantageously, the meteorological data may be determined by means of communication of the second communication module 36 of the mobile terminal 33 with the server 28. These meteorological data may be stored in a memory of the controller 35 of the mobile terminal 33 or of the server 28.

Advantageously, such meteorological data constitute a history at the predetermined location of the photovoltaic panel 25, particularly in terms of the solar radiation and temperature, so as to check the compatibility of the motorized drive device 5 for the installation 100.

Furthermore, the embodiments and variants envisioned may be combined in order to generate new embodiments of the invention, without departing from the scope of the invention as defined by the claims.

In the description above, FIGS. 5 to 8 are explanatory illustrations of the digital processing operations carried out. Complementary or alternative digital processing operations may be used. The methods to which the invention relates may at any moment not employ a display of one, some or all of these illustrations.

The invention claimed is:

1. A method for determining a solar mask for a closure, shading or solar protection installation,
   the method being carried out using a mobile terminal,
   the mobile terminal comprising at least:
       a controller,
       a photographic instrument, and
       an orientation detection device,
   the method comprising at least:
       positioning the mobile terminal at a predetermined location of a photovoltaic panel of an autonomous electrical energy supply device, the autonomous electrical energy supply device being configured to supply an electromechanical actuator of a motorized drive device with electrical energy, in an assembled configuration of the installation,
       after the positioning of the mobile terminal, acquiring a single photograph using the photographic instrument of the mobile terminal,
       determining an orientation of the photographic instrument of the mobile terminal during the acquiring of the photograph, using the orientation detection device and the controller of the mobile terminal,
       extending at least one contour of the acquired photograph, along at least one direction, using the controller of the mobile terminal, to obtain an extended photograph, and
       superposing data of the extended photograph with a solar path diagram, in a common reference frame, so as to determine a solar mask at the predetermined location of the photovoltaic panel.

2. The method for determining a solar mask for a closure, shading or solar protection installation according to claim 1, wherein the extending of the at least one contour of the acquired photograph is carried out along a plurality of directions, using the controller of the mobile terminal.

3. The method for determining a solar mask for a closure, shading or solar protection installation according to claim 2, wherein the directions of extension of the at least one contour of the acquired photograph are a top, a left and a right of the photograph.

4. The method for determining a solar mask for a closure, shading or solar protection installation according to claim 3, wherein the method comprises projecting data of the extended photograph into a projection reference frame, as a function of at least the orientation of the photographic instrument of the mobile terminal determined, during the determining, the projecting being carried out after the extending and before the superposing, and wherein the superposing is carried out based on data of the photograph projected, during the projecting, onto the solar path diagram.

5. The method for determining a solar mask for a closure, shading or solar protection installation according to claim 4, wherein the projection reference frame of the extended photograph is a spherical celestial arch reference frame.

6. A method for determining a solar mask for a closure, shading or solar protection installation according to claim 3, wherein the method furthermore comprises determining at least one sky region based on the acquired photograph, by image processing, using the controller of the mobile terminal.

7. The method for determining a solar mask for a closure, shading or solar protection installation according to claim 2, wherein the method comprises projecting data of the extended photograph into a projection reference frame, as a function of at least the orientation of the photographic instrument of the mobile terminal determined, during the determining, the projecting being carried out after the extending and before the superposing, and wherein the superposing is carried out based on data of the photograph projected, during the projecting, onto the solar path diagram.

8. The method for determining a solar mask for a closure, shading or solar protection installation according to claim 7, wherein the projection reference frame of the extended photograph is a spherical celestial arch reference frame.

9. A method for determining a solar mask for a closure, shading or solar protection installation according to claim 2, wherein the method furthermore comprises determining at least one sky region based on the acquired photograph, by image processing, using the controller of the mobile terminal.

10. The method for determining a solar mask for a closure, shading or solar protection installation according to claim 1, wherein the method comprises projecting data of the extended photograph into a projection reference frame, as a function of at least the orientation of the photographic instrument of the mobile terminal determined, during the determining, the projecting being carried out after the extending and before the superposing, and wherein the superposing is carried out based on data of the photograph projected, during the projecting, onto the solar path diagram.

11. The method for determining a solar mask for a closure, shading or solar protection installation according to claim 10, wherein the projection reference frame of the extended photograph is a spherical celestial arch reference frame.

12. The method for determining a solar mask for a closure, shading or solar protection installation according to claim 11, wherein the projecting of the data of the extended photograph is also carried out as a function of a focal length of a lens of the photographic instrument of the mobile terminal.

13. The method for determining a solar mask for a closure, shading or solar protection installation according to claim 11, wherein the projecting of data of the extended photograph is also carried out as a function of dimensions of an image sensor of the photographic instrument of the mobile terminal.

14. The method for determining a solar mask for a closure, shading or solar protection installation according to claim 10, wherein the projecting of the data of the extended photograph is also carried out as a function of a focal length of a lens of the photographic instrument of the mobile terminal.

15. The method for determining a solar mask for a closure, shading or solar protection installation according to claim 14, wherein the projecting of data of the extended photograph is also carried out as a function of dimensions of an image sensor of the photographic instrument of the mobile terminal.

16. The method for determining a solar mask for a closure, shading or solar protection installation according to claim 10, wherein the projecting of data of the extended photograph is also carried out as a function of dimensions of an image sensor of the photographic instrument the mobile terminal.

17. A method for determining a solar mask for a closure, shading or solar protection installation according to claim 1, wherein the method furthermore comprises determining at least one sky region based on the acquired photograph, by image processing, using the controller of the mobile terminal.

18. A mobile terminal comprising hardware and/or software elements configured to carry out the method for determining a solar mask for a closure, shading or solar protection installation according to claim 1.

19. A method for checking compatibility of a motorized drive device for a closure, shading or solar protection installation,
   the installation comprising at least:
      a shading device, the shading device comprising at least one screen,
      a motorized drive device, the screen being configured to be moved between an open position and a closed position using the motorized drive device, the motorized drive device comprising at least:
         an electromechanical actuator, and
         an autonomous electrical energy supply device, the autonomous electrical energy supply device comprising at least one photovoltaic panel and at least one electrical energy storage device, the autonomous electrical energy supply device being configured to supply the electromechanical actuator with electrical energy,
   the method being carried out using a mobile terminal,
   the mobile terminal comprising at least:
      a controller,
      a photographic instrument, and
      an orientation detection device,
   the method comprising at least:
      selecting the electromechanical actuator from a list of electromechanical actuators or inputting an identifier of the electromechanical actuator,
      selecting the photovoltaic panel from a list of photovoltaic panels or inputting an identifier of the photovoltaic panel,
      selecting the electrical energy storage device from a list of electrical energy storage devices or inputting an identifier of the electrical energy storage device,
      determining a geographical localization of the installation, determining a solar mask by the determination method according to claim 1, and checking compatibility of the motorized drive device was a function of the results of the selecting or inputting of the electromechanical actuator, the photovoltaic panel and the electrical energy storage device, the determining of the geographical localization of the installation, and the determining of the solar mask.

20. A mobile terminal comprising hardware and/or software elements configured to carry out the method for checking compatibility of a motorized drive device for a closure, shading or solar protection installation according to claim 19.

* * * * *